(12) United States Patent
Novak et al.

(10) Patent No.: US 9,267,084 B2
(45) Date of Patent: Feb. 23, 2016

(54) HYDROPROCESSING OF HIGH NITROGEN FEED USING BULK CATALYST

(71) Applicants: William J. Novak, Bedminster, NJ (US); Kathryn Y. Cole, Easton, PA (US); Patrick L. Hanks, Annandale, NJ (US); Timothy L. Hilbert, Fairfax, VA (US)

(72) Inventors: William J. Novak, Bedminster, NJ (US); Kathryn Y. Cole, Easton, PA (US); Patrick L. Hanks, Annandale, NJ (US); Timothy L. Hilbert, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 311 days.

(21) Appl. No.: 14/058,803

(22) Filed: Oct. 21, 2013

(65) Prior Publication Data

US 2014/0048448 A1     Feb. 20, 2014

Related U.S. Application Data

(62) Division of application No. 12/960,833, filed on Dec. 6, 2010, now Pat. No. 8,580,108.

(60) Provisional application No. 61/283,695, filed on Dec. 8, 2009.

(51) Int. Cl.
*C10G 65/16* (2006.01)
*B01J 23/00* (2006.01)
(Continued)

(52) U.S. Cl.
CPC ............... *C10G 65/16* (2013.01); *B01J 23/002* (2013.01); *B01J 23/8885* (2013.01); *C10G 3/46* (2013.01); *C10G 3/48* (2013.01); *C10G 3/50* (2013.01); *C10G 65/04* (2013.01); *C10G 65/08* (2013.01); *C10G 2300/1014* (2013.01); (Continued)

(58) Field of Classification Search
CPC .......... C10G 65/16; C10G 3/48; C10G 65/04; C10G 3/46; C10G 3/50; C10G 65/08; C10G 2400/04; C10G 2300/1055; C10G 2300/4018; C10G 2300/1018; C10G 2300/1014; B01J 37/031; B01J 23/8885; B01J 23/002
See application file for complete search history.

(56) References Cited

U.S. PATENT DOCUMENTS 4,596,785 A    6/1986   Toulhoat et al.
5,948,243 A    9/1999   Kallenbach
(Continued)

FOREIGN PATENT DOCUMENTS

EP     1153106 B1    7/2000
EP     1157083 B1    7/2000
(Continued)

OTHER PUBLICATIONS

Furimsky, Edward; Massoth, Franklin E., "Hydrodenitrogenation of Petroleum", Catalysis Reviews—Science and Engineering (2005), 47(3), pp. 297-489 (Abstract).
(Continued)

*Primary Examiner* — Randy Boyer
*Assistant Examiner* — Juan Valencia
(74) *Attorney, Agent, or Firm* — Glenn T. Barrett; Chad A. Guice (57) ABSTRACT

Methods are provided for hydrotreating high nitrogen feeds with improved results for nitrogen removal, aromatic saturation, and/or sulfur removal. The method includes hydrotreating the feed with a supported hydrotreating catalyst followed by a bulk metal catalyst, the hydrotreated effluent of which can be suitable for use as a feed to an FCC reactor.

2 Claims, 3 Drawing Sheets

(51) Int. Cl.
  *B01J 23/888* (2006.01)
  *C10G 3/00* (2006.01)
  *C10G 65/04* (2006.01)
  *C10G 65/08* (2006.01)

(52) U.S. Cl.
  CPC ............. *C10G 2300/1018* (2013.01); *C10G 2300/1051* (2013.01); *C10G 2300/1055* (2013.01); *C10G 2300/1059* (2013.01); *C10G 2300/202* (2013.01); *C10G 2300/301* (2013.01); *C10G 2300/308* (2013.01); *C10G 2300/4018* (2013.01); *C10G 2400/04* (2013.01)

(56) References Cited

U.S. PATENT DOCUMENTS

| | | | |
|---|---|---|---|
| 6,156,695 | A | 12/2000 | Soled et al. |
| 6,162,350 | A | 12/2000 | Soled et al. |
| 6,712,955 | B1 | 3/2004 | Hou et al. |
| 6,863,803 | B1 | 3/2005 | Riley et al. |
| 7,513,989 | B1 | 4/2009 | Soled et al. |
| 7,597,795 | B2 | 10/2009 | Schleicher et al. |
| 2005/0040080 | A1 | 2/2005 | Riley et al. |
| 2006/0058174 | A1 | 3/2006 | Chen et al. |

FOREIGN PATENT DOCUMENTS

| | | |
|---|---|---|
| EP | 1169416 B1 | 7/2000 |
| FR | 2903979 A1 | 1/2008 |
| RU | 2030444 | 3/1995 |
| WO | 2005047434 A1 | 5/2005 |
| WO | 2006036610 A1 | 4/2006 |
| WO | 2009065878 A2 | 5/2009 |

OTHER PUBLICATIONS

Eijsbouts, Sonja, "Life cycle of hydroprocessing catalysts and total catalyst management", Studies in Surface Science and Catalysis (1999), 127(Hydrotreatment and Hydrocracking of Oil Fractions), pp. 21-36 (Abstract).
Li, Yuan-Sheng, "Advances in heavy fraction hydrotreating catalysts", Gongye Cuihua (2004), 12(1), pp. 7-11 (Abstract).
PCT Search Report issued Aug. 1, 2012 in corresponding PCT Application No. PCT/US2010/059063 (6 pp).
PCT Written Opinion issued Aug. 1, 2012 in corresponding PCT Application No. PCT/US2010/059063 (10 pp).
Anabtawi et al, "Effects of Catalytic Hydrotreating on Light Cycle Oil Fuel Quality" Ind. Eng. Chem. Res. (1991) vol. 30, pp. 2586-2592.
Dahlberg et al., "Consider Using Integrated Hydroprocessing Methods for Processing Clean Fuels", Hydrocarbon Hydroprocessing, Sep. 2007.

HYDROPROCESSING OF HIGH NITROGEN FEED USING BULK CATALYST

CROSS-REFERENCE TO RELATED APPLICATIONS

This application is a divisional application of U.S. patent application Ser. No. 12/960,833, filed on Dec. 6, 2010, which claims the benefit of U.S. provisional patent application No. 61/283,695, filed on Dec. 8, 2009, the contents of which are hereby incorporated by reference in their entirety.

FIELD OF THE INVENTION

This invention provides a method for hydrotreatment of hydrocarbon feeds with elevated nitrogen contents. This invention also provides a method for enhanced utilization of less active catalysts for heteroatom removal.

BACKGROUND OF THE INVENTION

Crude oils of different origins can contain varying levels of contaminants within the feed. In some instances, the contaminant levels in a crude oil can be characteristic of the regional source of the crude oil. For example, crude oils extracted from sources in California tend to have high levels of nitrogen contamination. When such a California crude enters a refinery, the high nitrogen levels may impact multiple processes within a refinery.

Conventionally, it is known that the amount of nitrogen in a feed can negatively impact the catalytic activity in hydrotreating processes. This can lead to difficulties, as hydrotreatment is one of the most prevalent processes used for removal of nitrogen.

U.S. Pat. Nos. 6,162,350 and 7,513,989 describe a bulk metal catalyst composition that can be used for various types of hydroprocessing. Suitable feedstocks are described as including feeds that contain "substantial" amounts of nitrogen. A feed having a nitrogen content of at least 10 wppm is noted as an example of a feed containing a "substantial" amount of nitrogen. It is also noted that feeds having greater than 500 wppm of nitrogen can be treated. Experimental examples are also described where a vacuum gas oil feed having a nitrogen content of 858 wppm is hydrocracking in the presence of a bulk metal catalyst.

U.S. Pat. No. 7,597,795 describes a method for hydrotreating a lubricant oil basestock using a supported hydrotreating catalyst followed by a bulk metal catalyst. The feedstock for the process is described as having a nitrogen content of up to 0.2 wt %. Examples are provided of hydrotreating vacuum gas oil feeds with nitrogen contents as high as 1573 wppm.

SUMMARY OF THE INVENTION

In one aspect of the invention, a process for hydrotreating a feedstock having a relatively high nitrogen content is provided. The method includes contacting a hydrocarbon feedstock having a nitrogen content of at least about 3000 wppm with a supported hydrotreating catalyst under first hydrotreating conditions. The hydrotreated hydrocarbon feedstock can then be contacted with a sulfided bulk metal catalyst under second hydrotreating conditions to produce a hydrotreated effluent, said catalyst comprising a non-noble Group VIII metal molybdate in which at least a portion, but less than all, of the molybdenum has been replaced by tungsten. Prior to sulfidation, the bulk metal catalyst can be represented by the formula: $(X)_b(Mo)_c(W)_dO_z$, wherein X is a non-noble Group VIII metal, the molar ratio of b:(c+d) is from about 0.5:1 to about 3:1, the molar ratio of c:d is greater than about 0.01:1, and $z=[2b+6(c+d)]/2$.

In another aspect of the invention, another process for hydrotreating a feedstock having a relatively high nitrogen content is provided. The method includes contacting a hydrocarbon feedstock having a nitrogen content of at least about 3000 wppm with a supported hydrotreating catalyst under first hydrotreating conditions. The hydrotreated hydrocarbon feedstock can be contacted with a sulfided bulk metal catalyst under second hydrotreating conditions to produce a twice hydrotreated feedstock, said catalyst comprising a non-noble Group VIII metal molybdate in which at least a portion, but less than all, of the molybdenum has been replaced by tungsten. Prior to sulfidation the bulk metal catalyst can be represented by the formula: $(X)_b(Mo)_c(W)_dO_z$, wherein X is a non-noble Group VIII metal, the molar ratio of b:(c+d) is from about 0.5:1 to about 3:1, the molar ratio of c:d is greater than about 0.01:1, and $z=[2b+6(c+d)]/2$. The twice hydrotreated feedstock can then be contacted with a supported hydrotreating catalyst under third hydrotreating conditions to produce at least a thrice hydrotreated effluent. The thrice hydrotreated effluent can then be delivered to a fluid catalytic cracking stage.

In another aspect of the invention, a method for effectively utilizing heteroatom removal capability of a bulk catalyst in removing heteroatoms from a hydrocarbon feedstock is provided. The method includes: hydrotreating a first hydrocarbon feedstock by contacting the first feedstock with a bulk catalyst containing at least three of the following metals: cobalt, nickel, molybdenum, and tungsten (e.g., nickel, molybdenum, and tungsten), said bulk catalyst in its unused state having a relative volumetric catalytic activity for hydrodesulfurization and/or hydrodenitrogenation, with the contacting being done under conditions effective to at least partially hydrodesulfurize and/or hydrodenitrogenate the first feedstock, wherein the contacting continues until the bulk catalyst exhibits a relative volumetric hydrodesulfurization activity of not more than 60% (for example not more than 55% or not more than 50%) of the relative volumetric hydrodesulfurization activity in its unused (fresh) state; isolating the hydrotreated first hydrocarbon feedstock; hydrotreating a second hydrocarbon feedstock by contacting the second feedstock with the bulk catalyst whose relative volumetric hydrodesulfurization activity is not more than 60% (for example not more than 55% or not more than 50%) of the relative volumetric hydrodesulfurization activity in its unused state, with the contacting being done under conditions effective to at least partially hydrodesulfurize and/or hydrodenitrogenate the second feedstock, as well as to hydrodeoxygenate the second feedstock; and isolating the hydrotreated second hydrocarbon feedstock. Advantageously, in this aspect, one or more of the following can be satisfied: the second hydrocarbon feedstock can contain at least 10 wt % (for example at least 15 wt % or at least 20 wt %) more biocomponent content than the first hydrocarbon feedstock; the first hydrocarbon feedstock has a pre-treated sulfur content, the hydrotreated first hydrocarbon feedstock has a post-treated sulfur content, and the post-treated sulfur content can be no more than 3.0% (e.g., no more than 2.0%, no more than 1.0%, or no more than 0.5%) of the pre-treated sulfur content; the second hydrocarbon feedstock has a pre-treated oxygen content and a pre-treated sulfur content, the hydrotreated second hydrocarbon feedstock has a post-treated oxygen content and a post-treated sulfur content, the post-treated oxygen content can be no more than 1.0% (e.g., no more than 0.5%, no more than 0.3%, or no more than 0.1%) of the pre-treated oxygen content and/or the post-treated sulfur content can be no more than 3.0% (e.g., no more than 2.0%, no more than 1.0%, or no more than 0.5%) of the pre-treated sulfur content; and the isolated hydrotreated first hydrocarbon feedstock and the isolated hydrotreated second hydrocarbon feedstock can both be combined with each other and/or with a fuel pool (e.g., a diesel fuel pool).

DETAILED DESCRIPTION OF THE EMBODIMENTS

Overview

Conventional wisdom tells us that bulk metal catalysts are not generally suitable for processing feeds with nitrogen contents of about 0.3 wt % or greater. The presence of such high levels of nitrogen is believed to suppress any catalytic advantage provided by a bulk metal catalyst, in relation to a supported catalyst, for performing hydrodenitrogenation (HDN) and/or hydrodesulfurization (HDS). As a result, conventional processes have focused on using supported catalysts to hydrotreat feeds having nitrogen contents in excess of about 0.3 wt %.

Feeds with high nitrogen contents can also pose other difficulties during hydrotreating. For example, high nitrogen content can also suppress catalyst activity for aromatic saturation. This can pose particular problems for applications such as hydrotreatment prior to a fluid catalytic cracking process. Because the conditions in a conventional fluid catalytic cracking process do not result in substantial amounts of cracking of aromatic compounds, improvements in aromatic cracking and/or saturation in hydrotreating processes prior to a fluid catalytic cracking process are highly desirable.

In various embodiments, a method is provided for hydrotreating feeds having relatively high nitrogen content with improved nitrogen removal, aromatic saturation, and/or sulfur removal. The method includes hydrotreating the feed with a supported hydrotreating catalyst, followed by contacting with a bulk metal catalyst.

Feedstock

The feedstocks useful according to the invention can, in some embodiments, preferably be relatively high nitrogen content feedstocks including a gas oil fraction. In an embodiment, the final boiling point of such feedstocks can be about 1300° F. (about 704° C.) or less, for example about 1200° F. (about 649° C.) or less or about 1100° F. (about 593° C.) or less. Alternately, a feedstock can be characterized by the temperature required to boil a specified percentage of the feed. For example, the temperature required to boil at least 95 wt % of a feed is referred to as a "T95" boiling point. Preferably, a feedstock can have a T95 boiling point of about 1300° F. (about 704° C.) or less, for example about 1200° F. (about 649° C.) or less or about 1100° F. (about 593° C.) or less. In some instances, the feed can preferably include gas oil portions and can have an initial boiling point of at least about 400° F. (about 204° C.), for example at least about 450° F. (about 232° C.), at least about 500° F. (about 260° C.), or at least about 550° F. (about 288° C.). Additionally or alternately, the feed can include kerosene and/or diesel boiling range components, resulting in an initial boiling point of at least about 200° F. (about 93° C.), for example at least about 300° F. (about 149° C.). In another embodiment, the feed can have a T10 boiling point of at least about 300° F. (about 149° C.), for example at least about 400° F. (about 204° C.), at least about 450° F. (about 232° C.), at least about 500° F. (about 260° C.), or at least about 550° F. (about 288° C.). In other embodiments, the feedstock can have an API gravity of at least about 15, for example at least about 17, at least about 20, or at least about 22. A feedstock suitable for hydrotreatment according to the invention can be a feed for use in a fluid catalytic cracking process. Such a feed can typically be hydroprocessed in a relatively high severity hydrotreatment stage prior to introduction into the fluid catalytic cracking stage.

The feedstocks to be hydrotreated according to the invention can, in some embodiments, have nitrogen contents previously believed to be unsuitable for processing by a bulk hydrotreatment catalyst. In an embodiment, the nitrogen content of such feeds can be at least about 3000 wppm, for example at least about 4000 wppm or at least about 5000 wppm. Additionally or alternately, the feed nitrogen content can be about 8500 wppm or less, for example about 7500 wppm or less or about 6000 wppm or less. In an embodiment, feedstreams suitable for use herein can have a sulfur content from about 100 wppm to about 40,000 wppm sulfur. The sulfur content of the feed can be at least about 500 wppm, for example at least about 1500 wppm, at least about 2500 wppm, at least about 5000 wppm. Additionally or alternately, the sulfur content of the feed can be about 40,000 wppm or less, for example about 30,000 wppm or less, about 15,000 wppm or less, or about 5000 wppm or less.

Optionally, the feed can comprise a blend of a mineral oil feedstock with a biocomponent feedstock. By "mineral oil" feedstock is meant a fossil/mineral fuel source, such as crude oil, and not the commercial organic product, such as sold under CAS number 8020-83-5, e.g., by Aldrich. In the discussion below, a biocomponent feedstock refers to a hydrocarbon feedstock derived from a biological raw material component, from biocomponent sources such as vegetable, animal, fish, and/or algae. Generally, these biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui,* and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

The feedstock can include varying amounts of feedstreams based on biocomponent sources. When desired, the feed can include at least about 0.1 wt % of feed based on a biocomponent source, for example at least about 0.5 wt %, at least about 1 wt %, at least about 3 wt %, at least about 10 wt %, or at least about 15 wt %. In such embodiments, the feed can include about 60 wt % or less of biocomponent, for example about 50 wt % or less, about 40 wt % or less, or about 30 wt % or less. In other embodiments, the amount of biocomponent feed (e.g., for co-processing with the mineral oil portion of the feed) can be relatively small, for instance with a feed that includes at least about 0.5 wt % of feedstock based on a biocomponent source, e.g., at least about 1 wt %, at least about 2.5 wt %, or at least about 5 wt %. In such embodiments, the feed can include about 20 wt % or less of biocomponent based feedstock, for example about 15 wt % or less, about 10 wt % or less, or about 5 wt % or less.

The biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 10-12 wt % oxygen.

Supported Catalyst

Supported catalysts useful in various embodiments can be selected from conventional hydrotreating catalysts, such as a catalyst composed of a Group VIB metal and/or a Group VIII metal on a support. Suitable metals can include, but are not limited to, cobalt, iron, nickel, molybdenum, tungsten, and combinations thereof. In some preferred embodiments, the metals can include nickel and molybdenum or nickel, cobalt, and molybdenum. The total metals content on the supported catalyst can range from about 5 wt % to about 40 wt %, relative to the total weight of the catalyst. The support can be any suitable refractory support material, such as silica, alumina, silica-alumina, titania, zirconia, or the like, or a combination thereof.

Bulk Catalyst Composition

In certain embodiments, improved hydroprocessing can be achieved by including a bulk metal catalyst in at least one stage of a hydrotreatment process, e.g., for treating high nitrogen feeds. A catalyst composition comprising bulk catalyst particles can include about 30 wt % to about 100 wt % (preferably from about 40 wt % to about 99.9 wt %, for example from about 50 wt % to about 99.5 wt %, from about 60 wt % to about 99 wt %, from about 80 wt % to about 99.9 wt %, or from about 85 wt % to about 99.9 wt %) of at least one Group VIII (particularly non-noble) metal and at least one Group VIB metal, based on the total weight of the bulk catalyst particles, calculated as metal oxides.

Techniques for producing bulk metal catalyst particles are known and have been previously described, for example in U.S. Pat. No. 6,162,350, which is hereby incorporated by reference. Bulk metal catalyst particles can be made via methods where all of the metal catalyst precursors are in solution, or via methods where at least one of the precursors is in at least partly in solid form, optionally but preferably while at least another one of the precursors is provided only in a solution form. Providing a metal precursor at least partly in solid form can be achieved, for example, by providing a solution of the metal precursor that also includes solid and/or precipitated metal in the solution, such as in the form of suspended particles. Examples 2-4 below provide examples of using both a "solution" method and a "solid" method for creating bulk catalyst particles according to the invention.

Catalyst compositions comprising bulk catalyst particles comprising one Group VIII non-noble metal and two Group VIB metals can be preferred. Group references herein are made to the CAS version of the Periodic Table of Elements. It has been found that, in such cases, the bulk catalyst particles can be sintering-resistant. Thus, the active surface area of the bulk catalyst particles can be significantly maintained during use. The molar ratio of Group VIB to Group VIII non-noble metals can range generally from about 10:1 to about 1:10, preferably from about 3:1 to about 1:3. In some embodiments, a bulk catalyst particle may have a "core-shell" structure, where a catalyst particle is formed with a metal shell having a composition according the invention around a core of one the constituent metals. In the case of a core-shell structured particle, the above ratios can apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybdenum:tungsten ratio can preferably be in the range from about 9:1 to about 1:9. Preferably, the Group VIII non-noble metal can comprise nickel and/or cobalt. Additionally or alternatively, the Group VIB metal can comprise molybdenum and/or tungsten, preferably a combination of molybdenum and tungsten. In various preferred embodiments, combinations of Ni/Mo/W, Co/Mo/W, or Ni/Mo/Co/W can be used. These types of precipitates appear to be sinter-resistant. Thus, the active surface area of the precipitate can advantageously be retained during use. The metals can preferably be present as oxidic compounds of the corresponding metals, or, if the catalyst composition has been sulfided, as sulfidic compounds of the corresponding metals.

Preferably, the bulk metal particles can have a surface area of at least about 50 m$^2$/g, for example at least about 100 m$^2$/g, as measured via the B.E.T. method. It may further be preferred that the particles can comprise (or can consist essentially of) from about 50 wt % to about 100 wt %, for example from about 70 wt % to about 100 wt %, of at least one Group VIII non-noble metal and at least one Group VIB metal, based on the total weight of the particles, calculated as metal oxides. The amount of Group VIB and Group VIII non-noble metals can easily be determined, e.g., via TFM-EDX. For the purposes of the above embodiments, the term "consisting essentially of" is used to refer to catalysts that include the identified transition metals, but exclude other transition metals. Although the catalyst particles mentioned herein are disclosed to contain certain transition metals (e.g., in oxide form, or after the oxide form has been sulfidized under appropriate sulfidization conditions), optionally on a support, the (non-support) remainder of the catalyst particles may additionally or alternately contain additional components, such as other transition metals (e.g., rhenium, ruthenium, rhodium, iridium, chromium, vanadium, iron, cobalt, platinum, palladium, cobalt, nickel, molybdenum, tungsten, or combinations thereof), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof. All these transition and/or rare earth metals can generally be present in an oxidic form if the catalyst composition has been calcined and/or in a sulfided form if the catalyst composition has been sulfided.

In embodiments where the catalyst composition includes a binder material, such binder material can include silica, silica-alumina (such as conventional silica-alumina, silica-coated alumina and alumina-coated silica), alumina (such as (pseudo)boehmite or gibbsite), titania, zirconia, cationic clays or anionic clays (such as saponite, bentonite, kaoline, sepiolite, or hydrotalcite), or mixtures thereof. The particles can be embedded in the binder material, which can function as a "glue" to hold the particles together. Preferably, the particles can be substantially homogeneously distributed within the binder. The presence of the binder can thus generally lead to an increased mechanical strength and/or resiliency of the final catalyst composition. Generally, the catalyst composition of the invention can exhibit a mechanical strength, expressed as side crush strength, of at least about 1 lb/mm (about 4.4 N/mm), for example at least about 3 lb/mm (about 13 N/mm), measured on extrudates with a diameter of about 1 mm to about 2 mm. The binder material can generally contain about 0 wt % to about 90 wt % (based only on the weight of the binder material) of the Group VIB and/or Group VIII (non-noble) metals that are also contained in the bulk catalyst particles.

The amount of binder can depend on the desired activity of the catalyst composition and can be from about 0 wt % to about 95 wt % of the total composition, depending on the envisaged catalytic application. However, to take advantage of the unusual high activity of the bulk catalysts of the present invention, binder amounts, when present, can generally be in the range from about 0.1 wt % to about 70 wt % of the total composition, preferably from about 0.1 wt % to about 60 wt %, for example from about 0.1 wt % to about 20 wt %, from about 0.1 wt % to about 15 wt %, from about 0.1 wt % to about 10 wt %, from about 0.5 wt % to about 50 wt %, from about 0.5 wt % to about 20 wt %, from about 0.5 wt % to about 15 wt %, or from about 0.5 wt % to about 10 wt %.

In an embodiment, the pore size distribution of the particles can be approximately the same as for conventional hydrotreating catalysts. For example, the particles can have a pore volume from about 0.05 mL/g to about 5 mL/g, for example from about 0.1 mL/g to about 4 mL/g, from about 0.1 mL/g to about 3 mL/g, or from about 0.1 mL/g to about 2 mL/g, as determined by nitrogen adsorption methods. It can be preferred that pores smaller than about 1 nm are substantially not present. The particles can have a median diameter of at least about 50 μm, for example at least about 100 μm, and/or not more than about 5000 μm, for example not more than about 3000 μm. In a preferred embodiment, the median particle diameter can be from about 250 μm to about 2500 μm, for example from about 500 μm to about 2000 μm.

The bulk catalyst particles can have a characteristic X-ray diffraction pattern that can differ from conventional hydroprocessing catalysts obtained by impregnation or co-mixing. The X-ray diffraction pattern of the bulk catalyst particles can comprise, and can preferably consist essentially of, peaks characteristic to the reacted metal components. For example, a nickel hydroxy-carbonate component contacted with a molybdenum and tungsten component can result in bulk catalyst particles characterized by an X-ray diffraction (XRD) pattern comprising peaks exhibiting approximate d values of: (4.09), 2.83, 2.54, 2.32, 2.23, 1.71, (1.54), 1.47. Values in brackets indicate that the corresponding peaks can be rather broad, can have a relatively low intensity, and/or are not readily distinguishable. The phrase "consist essentially of", with reference to the aforementioned XRD pattern, should be understood to mean that, apart from the explicitly recited peaks, there are substantially no further peaks contained in the diffraction pattern. The precipitate for catalyst obtained by the solution route can have a characteristic XRD pattern that differs from catalyst obtained by co-mixing and conventional hydroprocessing catalysts obtained by impregnation. For instance the XRD pattern of a Ni/Mo/W precipitate, as prepared by the solution route, can exhibit peaks at approximate d values of: 2.52, 1.72, and 1.46.

In another embodiment, the bulk catalyst particles obtained can be characterized by an XRD pattern that contains virtually no peak corresponding to any of the metal components applied in this process as starting materials. Of course, if desired, it can also be possible to choose the amounts of metal components in such a way as to obtain bulk catalyst particles characterized by an XRD pattern still comprising one or more peaks characteristic to at least one of these metal components. If, e.g., a high amount of the metal component which is at least partly in the solid state during contacting is added, or if this metal component is added in the form of relatively large particles, small amounts of this metal component may be traced in the XRD pattern of the resulting bulk catalyst particles.

Generally, if the solid route is applied, at least one of the metals can be anisotropically distributed in the particles. The metal of the metal component at least partly in the solid state during the solid route can generally be concentrated in the inner part, i.e., the core, of the final particles. Generally, the concentration of this metal in the outer part, i.e., the shell, of the final particles can be at most about 95%, and in most cases at most about 90%, of the concentration of this metal in the core of the final particles. Further, it has been found that the metal of a metal component applied in the solute state during the solid route may also be anisotropically distributed in the particles. In such situations, the concentration of this metal in the core of the particles can particularly be lower than the concentration of this metal in the shell. For instance, the concentration of this metal in the core of the particles can be at most about 80%, in some embodiments at most about 65% or at most about 50%, of the concentration of this metal in the shell. It must be noted that the above-described anisotropic metal distributions may be found in the composition of the invention, independently of whether the composition has been calcined and/or sulfided or not.

In the above cases, the shell can generally have a thickness from about 50 nm to about 1000 nm, preferably from about 100 nm to about 500 nm. The amount of these particles in the catalyst composition of the invention can preferably be from about 5 wt % to about 100 wt %, based on the total weight of the catalyst composition.

The surface area of the catalyst composition can preferably be at least about 40 m$^2$/g, for example at least about 80 m$^2$/g or at least about 120 m$^2$/g. The total pore volume of the catalyst composition can preferably be at least about 0.05 mL/g, for example at least about 0.1 mL/g, as determined by water porosimetry. To obtain catalyst compositions with relatively high mechanical strength, it may be desirable for the catalyst composition of the invention to have a relatively low macroporosity.

In a preferred embodiment, the catalyst composition can comprise a bulk mixed metal oxide (preferably sulfided prior to use), which can be represented by the formula $(Ni)_b(Mo)_c(W)_dO_z$, wherein the molar ratio of b:(c+d) can be from about 0.5:1 to about 3:1, preferably from about 0.75:1 to about 1.5:1, for example from about 0.75:1 to about 1.25:1. The molar ratio of c:d can preferably be greater than about 0.01:1, preferably greater than about 0.1:1, for example from about 1:10 to about 10:1, from about 1:3 to about 3:1, or corresponding to substantially equimolar amounts of Mo and W (e.g., between about 2:3 and about 3:2). Given the preferred valences of nickel being 2 and Mo and W being 6, the amount of oxygen can preferably be z=[2b+6(c+d)]/2. In such an embodiment, the catalyst composition can comprise or can consist essentially of a substantially amorphous material having a unique XRD pattern, showing crystalline peaks at d≈2.53 Å and 1.70 Å.

Process Conditions

In various embodiments, the reaction conditions can be selected to be effective hydrotreatment conditions. One possible type of effective hydrotreatment conditions can be conditions suitable for hydrotreatment of a feed prior to fluid catalytic cracking. A bulk metal hydrotreating catalyst can be included as at least a portion of the hydrotreating catalyst used for the hydrotreatment process. For example, in a hydrotreatment process involving multiple beds of hydrotreating catalyst, at least a portion of one bed can comprise a bulk metal catalyst. The amount of bulk metal hydrotreating catalyst can correspond to at least about 10% of a bed, for example at least about 25% of a bed, at least about 50% of a bed, at least one entire bed, or at least multiple entire beds within a hydrotreatment reaction system. The bulk metal hydrotreating catalyst can be included at any convenient location within the hydrotreating reactors, stages, and/or beds, preferably toward the downstream end of the hydrotreatment process, for example in at least about the latter half of the catalyst to which a feedstock is exposed.

The reaction conditions can include an LHSV from about 0.1 hr$^{-1}$ to about 2.0 hr$^{-1}$, a total pressure from about 800 psig (about 5.5 MPag) to about 3000 psig (about 20.7 MPag), a treat gas rate of at least about 1000 scf/b (about 170 Nm$^3$/m$^3$), for example at least about 2000 scf/b (about 340 Nm$^3$/m$^3$) of at least about 80% hydrogen (e.g., remainder inert gas), and a temperature from about 600° F. (about 316° C.) to about 800° F. (about 427° C.). In one preferred embodiment, the reaction conditions can include an LHSV from about 0.5 hr$^{-1}$ to about 1.5 hr$^{-1}$, a total pressure from about 1400 psig (about 9.7 MPag) to about 2000 psig (about 13.8 MPag), a hydrogen treat gas rate from about 2000 scf/b (about 340 Nm$^3$/m$^3$) to about 5000 scf/b (about 840 m$^3$/m$^3$) of at least about 80% hydrogen (e.g., remainder inert gas), and a temperature from about 650° F. (about 343° C.) to about 750° F. (about 399° C.).

Additionally or alternatively, the hydrogen treat gas rate can be from about 2500 scf/b (about 420 Nm$^3$/m$^3$) to about 4000 scf/b (about 670 Nm$^3$/m$^3$) of at least about 90% hydrogen (e.g., remainder inert gas).

The hydrotreatment can be performed by exposing a feed to a catalyst in one or more reactors and/or stages, with each reactor and/or stage possibly including one or more catalyst beds. Optionally, one or more intermediate separations and/or quenches may be included between successive reactors, stages, or beds during the hydrotreatment. Intermediate separations could be used, for example, to reduce the concentration of H$_2$S and/or NH$_3$ generated in the reaction system during the hydrotreatment. Intermediate quenches can be used, for example, to control reaction temperatures that may rise, due to the exothermic nature of many reactions occurring during hydrotreatment.

After hydrotreatment and to the extent necessary, the hydrotreated feed can be passed to a separator/fractionator for removal of gas phase products, such as H$_2$S, CO, CO$_2$, and/or NH$_3$. The fractionation can optionally also produce a diesel boiling range fraction and a heavier fraction such as a gas oil fraction. After removal of the gas phase products, the hydrotreated feed (or at least the heavier fraction) can be sent to a fluid catalytic cracking unit, e.g., for production of a naphtha product.

Reaction Products

In various embodiments, process conditions can be selected to effectively hydrotreat a relatively high nitrogen content feedstock. Conditions can be selected to achieve one or more desired product characteristics. For example, the hydrotreating conditions can be selected to achieve a sulfur content of about 1000 wppm or less, for example about 500 wppm or less, about 350 wppm or less, or about 250 wppm or less. Additionally or alternatively, the sulfur content can be reduced to about 100 wppm or more, for example about 200 wppm or more or about 500 wppm or more. These sulfur levels can allow the hydrotreated effluent to be used as an input for a fluid catalytic cracking process.

In addition or alternatively to the sulfur content, the hydrotreating conditions can be selected to achieve a nitrogen level of about 1200 wppm or less, for example about 1000 wppm or less, about 900 wppm or less, about 750 wppm or less, or about 500 wppm or less. Additionally or alternatively, the nitrogen content can be reduced to about 100 wppm or more, for example about 200 wppm or more or about 500 wppm or more.

In addition or alternatively to the sulfur and/or nitrogen content, the hydrotreating conditions can be selected to achieve an improved amount of aromatics saturation in a hydrotreated effluent, e.g., to produce a hydrotreated effluent having an API gravity of greater than about 25. Additionally or alternatively, the hydrotreating conditions can be selected to produce a hydrotreated effluent having an API gravity that greater than the API gravity of the feedstock, for example at least about 1 greater, at least about 3 greater, or at least about 5 greater.

Additional Embodiments

In an alternate embodiment, the present invention can relate to a method for effectively utilizing heteroatom removal capability of a bulk catalyst in removing heteroatoms from a hydrocarbon feedstock, the method comprising: hydrotreating a first hydrocarbon feedstock by contacting the first feedstock with a bulk catalyst containing at least three of the following metals: cobalt, nickel, molybdenum, and tungsten (e.g., nickel, molybdenum, and tungsten, as detailed hereinabove), said bulk catalyst in its unused state having a relative volumetric catalytic activity for hydrodesulfurization and/or hydrodenitrogenation, with the contacting being done under conditions effective to at least partially hydrodesulfurize and/or hydrodenitrogenate the first feedstock, wherein the contacting continues until the bulk catalyst exhibits a relative volumetric hydrodesulfurization activity of not more than 60% (for example not more than 55% or not more than 50%) of the relative volumetric hydrodesulfurization activity in its unused state; isolating the hydrotreated first hydrocarbon feedstock; hydrotreating a second hydrocarbon feedstock by contacting the second feedstock with the bulk catalyst whose relative volumetric hydrodesulfurization activity is not more than 60% (for example not more than 55% or not more than 50%) of the relative volumetric hydrodesulfurization activity in its unused state, with the contacting being done under conditions effective to at least partially hydrodesulfurize and/or hydrodenitrogenate the second feedstock, as well as to hydrodeoxygenate the second feedstock; and isolating the hydrotreated second hydrocarbon feedstock. Advantageously, in this embodiment, one or more of the following can be satisfied: the second hydrocarbon feedstock can contain at least 10 wt % (for example at least 15 wt % or at least 20 wt %) more biocomponent content than the first hydrocarbon feedstock; the first hydrocarbon feedstock has a pre-treated sulfur content, the hydrotreated first hydrocarbon feedstock has a post-treated sulfur content, and the post-treated sulfur content can be no more than 3.0% (e.g., no more than 2.0%, no more than 1.0%, or no more than 0.5%) of the pre-treated sulfur content; the second hydrocarbon feedstock has a pre-treated oxygen content and a pre-treated sulfur content, the hydrotreated second hydrocarbon feedstock has a post-treated oxygen content and a post-treated sulfur content, the post-treated oxygen content can be no more than 1.0% (e.g., no more than 0.5%, no more than 0.3%, or no more than 0.1%) of the pre-treated oxygen content and/or the pre-treated sulfur content can be no more than 3.0% (e.g., no more than 2.0%, no more than 1.0%, or no more than 0.5%) of the post-treated sulfur content; and the isolated hydrotreated second hydrocarbon feedstock can both be combined with each other and/or with a fuel pool (e.g., a diesel fuel pool).

Additionally or alternatively in such embodiment(s), one or more of the following can be satisfied: the first hydrocarbon feedstock can have a sulfur content of at least 500 wppm and can be comprised of from 80 wt % to 100 wt % of a diesel boiling range mineral feedstock and from 0 wt % to 20 wt % of a diesel boiling range biocomponent feedstock; the second hydrocarbon feedstock can have a sulfur content of at least 500 wppm and/or an oxygen content of at least 1 wt % and can be comprised of from 10 wt % to 80 wt % of a diesel boiling range mineral feedstock and from 20 wt % to 90 wt % of a diesel boiling range biocomponent feedstock; and the contacting in the first hydrotreatment step can continue until the bulk catalyst exhibits a relative volumetric hydrodesulfurization activity of not more than 50% of the relative volumetric hydrodesulfurization activity in its unused state.

Further additionally or alternatively, the present invention includes one or more of the following embodiments.

Embodiment 1

A process for hydrotreating a feedstock having a high nitrogen content, comprising: (a) contacting a hydrocarbon feedstock having a nitrogen content of at least about 3000 wppm with a supported hydrotreating catalyst under first hydrotreating conditions; and (b) contacting the hydrotreated hydrocarbon feedstock with a sulfided bulk metal catalyst under second hydrotreating conditions to produce a hydrotreated effluent, said catalyst comprising a non-noble Group VIII metal molybdate in which at least a portion, but less than all, of the molybdenum has been replaced by tungsten, wherein the bulk metal catalyst, prior to sulfidation, is represented by the formula: $(X)_b(Mo)_c(W)_dO_z$, wherein X is a non-noble Group VIII metal, the molar ratio of b:(c+d) is from about 0.5:1 to about 3:1, the molar ratio of c:d is greater than about 0.01:1, and z=[2b+6(c+d)]/2.

Embodiment 2

A process for hydrotreating a feedstock having a high nitrogen content, comprising: (a) contacting a hydrocarbon feedstock having a nitrogen content of at least about 3000 wppm with a supported hydrotreating catalyst under first hydrotreating conditions; (b) contacting the hydrotreated hydrocarbon feedstock with a sulfided bulk metal catalyst under second hydrotreating conditions to produce a twice hydrotreated feedstock, said catalyst comprising a non-noble Group VIII metal molybdate in which at least a portion, but less than all, of the molybdenum has been replaced by tungsten, wherein the bulk metal catalyst, prior to sulfidation, is represented by the formula: $(X)_b(Mo)_c(W)_dO_z$, wherein X is a non-noble Group VIII metal, the molar ratio of b:(c+d) is from about 0.5:1 to about 3:1, the molar ratio of c:d is greater than about 0.01:1, and z=[2b+6(c+d)]/2; (c) contacting the twice hydrotreated feedstock with a supported hydrotreating catalyst under third hydrotreating conditions to produce at least a thrice hydrotreated effluent; and (d) delivering the thrice hydrotreated effluent to a fluid catalytic cracking stage.

Embodiment 3

The process of embodiment 1 or embodiment 2, wherein the hydrocarbon feedstock has an API gravity of at least about 20.

Embodiment 4

The process of any one of the previous embodiments, wherein the hydrocarbon feedstock has a T10 boiling point of at least about 300° F. (about 149° C.).

Embodiment 5

The process of any one of the previous embodiments, wherein the hydrotreated effluent has an API gravity greater than an API gravity of the hydrocarbon feedstock, and preferably wherein the hydrotreated effluent has an API gravity greater than about 25.

Embodiment 6

The process of any one of the previous embodiments, wherein the molar ratio of b:(c+d) is from about 0.75:1 to about 1.25:1.

Embodiment 7

The process of any one of the previous embodiments, wherein the molar ratio of c:d is from about 1:10 to 10:1.

Embodiment 8

The process of any one of the previous embodiments, wherein the hydrocarbon feedstock has a nitrogen content of at least about 4000 wppm.

Embodiment 9

The process of any one of the previous embodiments, wherein at least one of the first hydrotreating conditions, the second hydrotreating conditions, and the third hydrotreating conditions include an LHSV from about 0.1 $hr^{-1}$ to about 2.0 $hr^{-1}$, a total pressure from about 800 psig (about 5.5 MPag) to about 3000 psig (about 20.7 MPag), a treat gas rate of at least about 1000 scf/b (about 170 $Nm^3/m^3$) using at least 80% hydrogen, and a temperature from about 600° F. (about 316° C.) to about 800° F. (about 427° C.).

Embodiment 10

The process of any one of the previous embodiments, wherein at least one of the first hydrotreating conditions, the second hydrotreating conditions, and the third hydrotreating conditions include an LHSV from about 0.5 $hr^{-1}$ to about 1.5 $hr^{-1}$, a total pressure from about 1400 psig (about 9.7 MPag) to about 2000 psig (about 13.8 MPag), a hydrogen treat gas rate from about 2000 scf/b (about 340 $Nm^3/m^3$) to about 5000 scf/b (about 840 $Nm^3/m^3$) using at least 80% hydrogen, and a temperature from about 650° F. (about 343° C.) to about 750° F. (about 399° C.).

Embodiment 11

The process of any one of the previous embodiments, wherein X comprises Ni or Co, preferably wherein X is Ni.

Embodiment 12

A method for effectively utilizing heteroatom removal capability of a bulk catalyst in removing heteroatoms from a hydrocarbon feedstock, the method comprising: hydrotreating a first hydrocarbon feedstock by contacting the first feedstock with a bulk catalyst containing at least three of the following metals: cobalt, nickel, molybdenum, and tungsten (e.g., nickel, molybdenum, and tungsten), said bulk catalyst in its unused state having a relative volumetric catalytic activity for hydrodesulfurization and/or hydrodenitrogenation, with the contacting being done under conditions effective to at least partially hydrodesulfurize and/or hydrodenitrogenate the first feedstock, wherein the contacting continues until the bulk catalyst exhibits a relative volumetric hydrodesulfurization activity of not more than 60% (for example not more than 55% or not more than 50%) of the relative volumetric hydrodesulfurization activity in its unused (fresh) state; isolating the hydrotreated first hydrocarbon feedstock; hydrotreating a second hydrocarbon feedstock by contacting the second feedstock with the bulk catalyst whose relative volumetric hydrodesulfurization activity is not more than 60% (for example not more than 55% or not more than 50%) of the relative volumetric hydrodesulfurization activity in its unused state, with the contacting being done under conditions effective to at least partially hydrodesulfurize and/or hydrodenitrogenate the second feedstock, as well as to hydrodeoxygenate the second feedstock; and isolating the hydrotreated second hydrocarbon feedstock, wherein: the second hydrocarbon feedstock contains at least 10 wt % (for example at least 15 wt % or at least 20 wt %) more biocomponent content than the first hydrocarbon feedstock; the first hydrocarbon feedstock has a pre-treated sulfur content, the hydrotreated first hydrocarbon feedstock has a post-treated sulfur content, and the post-treated sulfur content is no more than 3.0% (e.g., no more than 2.0%, no more than 1.0%, or no more than 0.5%) of the pre-treated sulfur content; the second hydrocarbon feedstock has a pre-treated oxygen content and a pre-treated sulfur content, the hydrotreated second hydrocarbon feedstock has a post-treated oxygen content and a post-treated sulfur content, the post-treated oxygen content is no more than 1.0% (e.g., no more than 0.5%, no more than 0.3%, or no more than 0.1%) of the pre-treated oxygen content, and the pre-treated sulfur content is no more than 3.0% (e.g., no more than 2.0%, no more than 1.0%, or no more than 0.5%) of the post-treated sulfur content; and the isolated hydrotreated first hydrocarbon feedstock and the isolated hydrotreated second hydrocarbon feedstock are both combined with a fuel pool (e.g., a diesel fuel pool).

Embodiment 13

The method of embodiment 12, wherein the first hydrocarbon feedstock has a sulfur content of at least 500 wppm and is comprised of from 80 wt % to 100 wt % of a diesel boiling range mineral feedstock and from 0 wt % to 20 wt % of a diesel boiling range biocomponent feedstock; wherein the second hydrocarbon feedstock has a sulfur content of at least 500 wppm and an oxygen content of at least 1 wt % and is comprised of from 10 wt % to 80 wt % of a diesel boiling range mineral feedstock and from 20 wt % to 90 wt % of a diesel boiling range biocomponent feedstock; and wherein the contacting in the first hydrotreatment step continues until the bulk catalyst exhibits a relative volumetric hydrodesulfurization activity of not more than 50% of the relative volumetric hydrodesulfurization activity in its unused state.

EXAMPLES

This invention is illustrated in greater detail by the specific examples presented below. It is understood that these examples are to be considered as specific examples or embodiments of the overall aspect of the invention as claimed.

Example 1

Reaction System

Figure 1:
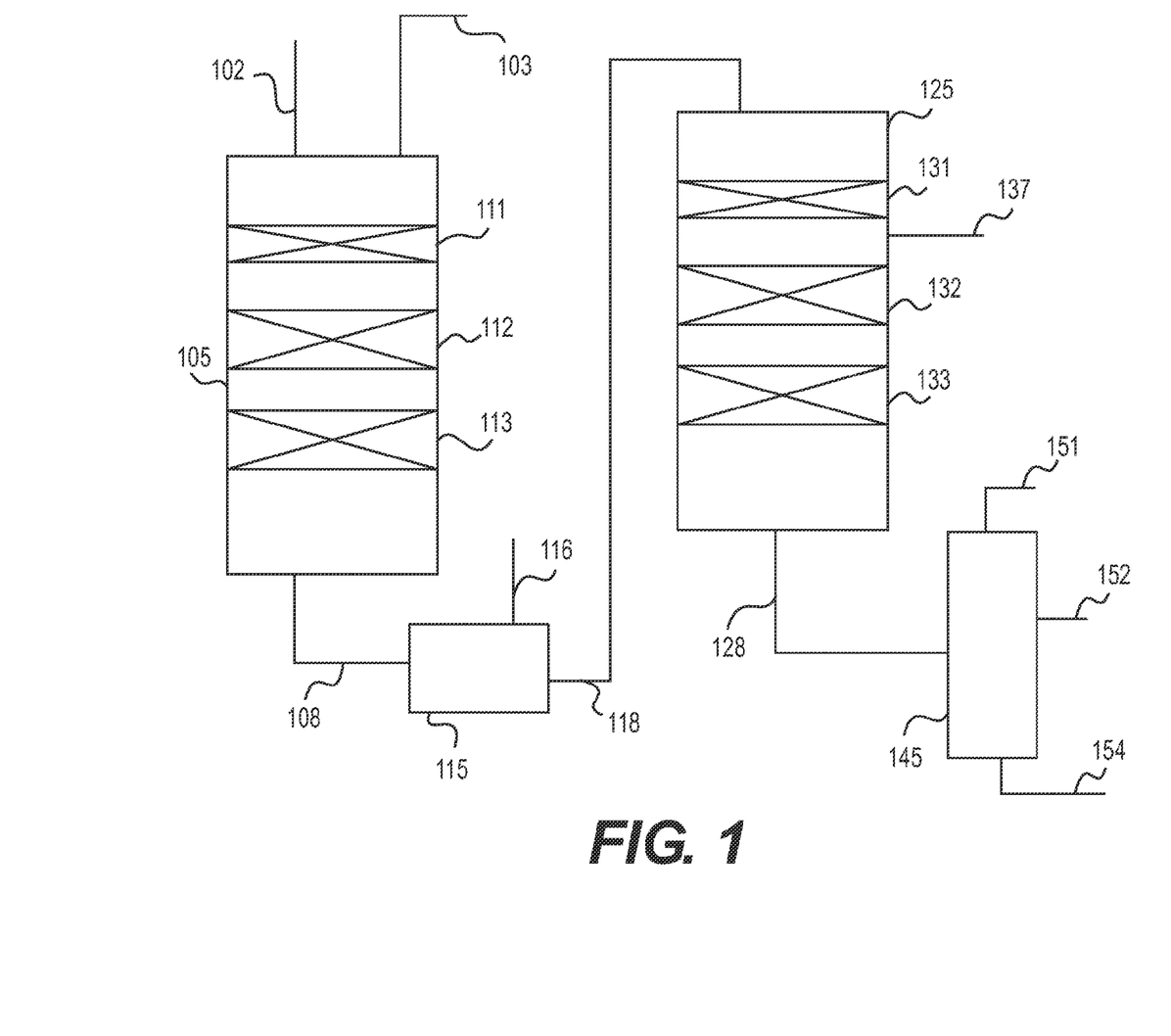
FIG. 1 schematically shows a reaction system for performing a process according to an embodiment of the invention.

A reaction system suitable for carrying out the above processes is shown schematically in FIG. 1. In FIG. 1, two hydrotreatment reactors 105 and 125 are pictured. Reactor 105 can include beds 111, 112, and 113, while reactor 106 can include beds 131, 132, and 133. In other embodiments, any convenient numbers of reactors can be used to have any convenient number of stages that include any convenient number of beds. As an alternative example, another option would be to have two reactors, with two beds in a first reactor and four beds in a second reactor.

In FIG. 1, bed 111 can be used as a guard bed, including catalysts suitable for demetallization and/or other removal of heavy metal contaminants such as arsenic. Examples of suitable guard bed catalysts can include, but are not limited to, catalyst particles composed substantially of a refractory material, such as alumina, and/or relatively low activity particles such as a low activity nickel catalyst supported on alumina. Other suitable demetallization and/or guard bed catalysts are conventionally known.

In FIG. 1, beds 112 and 113 can include a hydrotreatment catalyst, such as a catalyst including a Group VIB and a Group VIII metal supported on a refractory support. All of the beds in reactor 105 can be operated under effective hydrotreating conditions.

A feed 102 can be passed into reactor 105, along with a hydrogen stream 103. The feed 102 can be hydrotreated by exposing the feed to the catalysts in beds 111, 112, and 113. The effluent 108 from reactor 105 can be passed to an intermediate separator 115. Intermediate separator 115 can allow for removal by separation of gas phase contaminants 116 (such as $H_2S$, CO, $CO_2$, and/or $NH_3$) that may be produced during the reactions occurring in reactor 105. Additionally or alternately, a separator can be included at any other convenient location in the reaction system including between any beds, stages, or reactors as desired.

The liquid phase product 118 from separator 115 can then be passed to reactor 125. Beds 131 and 133 in reactor 125 can include supported hydrotreating catalyst. Bed 132 can includes a portion of supported hydrotreating catalyst and a portion of bulk metal catalyst. All of the beds in reactor 125 can be operated under effective hydrotreating conditions. An optional quench gas stream 137 can be introduced into reactor 125 at a convenient location, such as between beds 131 and 132. The quench gas stream 137 can be any convenient gas for controlling temperature within the reaction system. Preferably, quench gas stream 137 can be a hydrogen containing stream. Additionally or alternately, an optional quench gas stream at any other convenient location and/or more than one quench gas stream can be used.

The effluent 128 from the second reactor 125 can then be passed to a fractionator or separator 145. If the entire liquid effluent from second reactor 125 is used as a feed for another reaction, such as a fluid catalytic cracking reaction, then a separator can be used just to remove contaminant gases and non-condensable hydrocarbons 151. Alternately, a fractionator 145 can be used to produce at least two products, such as a diesel boiling range product 152 and a higher boiling product 154. The higher boiling product can be used as an input for a fluid catalytic cracking process, and/or the diesel boiling range product can be blended with other diesel streams and/or undergo further processing for eventual inclusion in the diesel fuel pool. In other embodiments, any other convenient cut point can be used to create two or more desired streams from a fractionator 145.

Example 2

Preparation of $NiMo_{0.5}W_{0.5}O_4$ by Boiling Decomposition

In a 1-liter flask, about 13.2 grams of ammonium molybdate (about 0.075 moles Mo), about 18.7 grams of ammonium metatungstate (about 0.075 moles W), and about 43.6 grams of nickel nitrate hexahydrate (about 0.15 moles Ni) were dissolved in approximately 300 mL of water, so that the resulting pH was about 4.3. To this solution, a concentrated $NH_4OH$ solution (about 600 mL) was added until the pH reached about 10. At this point, some precipitate remained. The solution was refluxed at about 100° C. for about 3 hours, during which heating the precipitate dissolved to give a clear blue solution, and, upon further heating, a green precipitate formed. The heating was continued until the pH was between about 6.8 and about 7. The suspension was then cooled to room temperature (about 20-25° C.), filtered, washed with water, and dried at approximately 120° C. overnight (about 12-16 hours). About 18 grams of material was obtained, with the XRD spectrum showing an amorphous background with the two largest peaks being at d≈2.58 Å and 1.70 Å.

Example 3

Preparation of NiMo$_{0.5}$W$_{0.5}$O$_4$ by Direct Precipitation

In a 1-liter flask, about 17.65 grams of ammonium molybdate (about 0.1 mole Mo) and about 24.60 grams of ammonium metatungstate (about 0.1 mole W) were dissolved in about 800 mL of water, giving a solution pH of about 5.2. To this solution, about 0.4 moles of NH$_3$ (about 30 mL) was added, raising the pH to about 9.8 (solution A). This solution was warmed to about 90° C. A second solution was prepared by adding about 58.2 grams of nickel nitrate (about 0.2 moles Ni), which was dissolved in approximately 50 mL of water (solution B), and was maintained at a temperature of about 90° C. This solution was added dropwise at a rate of about 7 mL/min into the ammonium molybdate/ammonium metatungstate solution. A precipitate began to form after about ¼ of the solution was added. This suspension, which was at a pH about 6.5, was stirred for about 30 minutes, while the temperature was maintained at about 90° C. The material was filtered hot, washed with hot water, and dried at about 120° C. Approximately 38 grams of material was recovered.

Example 4

Preparation of NiMo$_{0.5}$W$_{0.5}$O$_4$ by Controlled pH Precipitation

Two solutions were prepared with approximately the same amounts of nickel, tungsten, molybdenum, and ammonia (ammonium hydroxide) as described in Example 3 (solutions A and B), except that each solution contained about 700 mL of water. The two solutions were added into a separate vessel initially containing about 400 mL of water held at about 90° C. Solution B (the acidic solution) was pumped into the vessel at a constant rate of about 15 mL/min, while solution A was added through a separate pump under feedback PC control, which was set to maintain the pH at about 6.5. On mixing the two solutions, a precipitate formed. The slurry was stirred at about 90° C. for about 30 minutes, filtered hot, washed with hot water, and dried at about 120° C.

Example 5

Working and Comparative Example of Hydrotreatment Processes

Four reactors were each loaded with hydrotreating catalyst. Reactors 1 and 2 were loaded with 100% of a conventional supported NiMo hydrotreating catalyst. Reactor 3 was loaded with about 75% of the conventional supported NiMo hydrotreating catalyst on top of about 25% of a bulk metal hydrotreating catalyst according to the invention (in other words, the bulk metal catalyst was in the downstream ~25% of the reactor). In Reactor 3, the bulk metal hydrotreating catalyst was a NiMo$_{0.5}$W$_{0.5}$O$_4$ version of the bulk catalyst. The fourth reactor was loaded with about 50% of the conventional supported NiMo hydrotreating catalyst on top of about 50% of the NiMo$_{0.5}$W$_{0.5}$O$_4$ version of the bulk metal hydrotreating catalyst.

The catalyst in Reactor 1 was sulfided via a gas phase sulfidation procedure using about 3% H$_2$S/H$_2$. For reactors 2-4, the sulfidation was performed as a liquid phase sulfidation using the 3% H$_2$S/H$_2$ along with a feed primarily composed of a feed that was previously hydrotreated to a sufficient degree to be suitable for use in an FCC process. Each reactor was then conditioned for about three days by running a virgin vacuum gas oil feed through each reactor under the hydrotreating conditions described below.

For the hydrotreatment examples, a feed was used that was a combination of a virgin vacuum gas oil and a product gas oil stream from a coker. The feed characteristics included an API gravity of about 20.3, a sulfur content of about 1.2 wt %, a nitrogen content of about 0.57 wt % (including basic nitrogen content between about 1600 wppm and about 1700 wppm), an initial boiling point of about 206° F. (about 97° C.), a T50 boiling point of about 705° F. (about 374° C.), and a final boiling point of about 1188° F. (about 642° C.). The reaction conditions for each reactor included a pressure of about 1800 psig (about 12.4 MPag), a treat gas rate of about 3300 scf/b (about 558 Nm$^3$/m$^3$) of H$_2$, a reaction temperature of about 680° F. (about 360° C.), and an LHSV of about 1.0 hr$^{-1}$.

Figure 2:
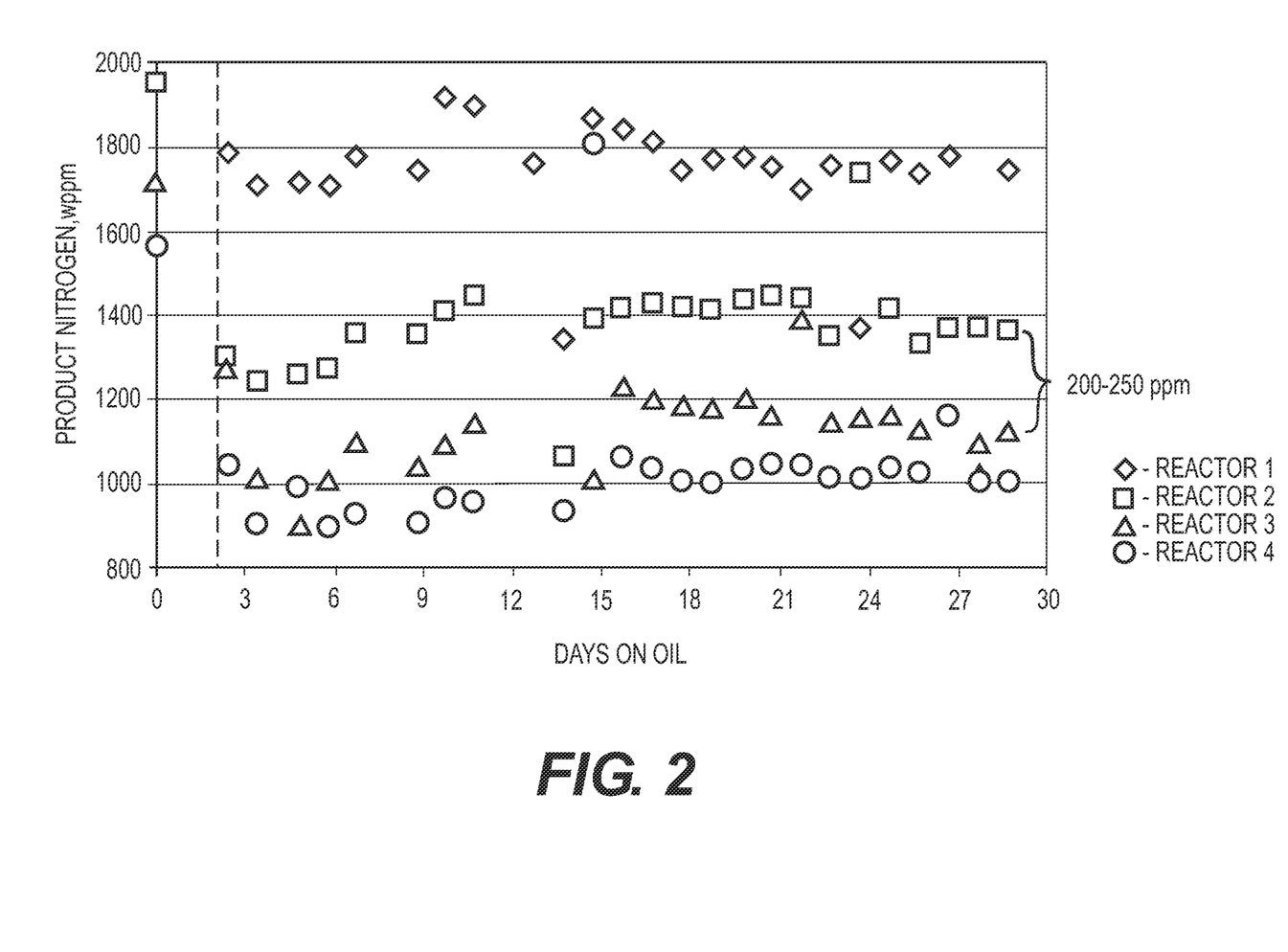
FIG. 2 shows nitrogen removal using various catalyst systems.
Figure 3:
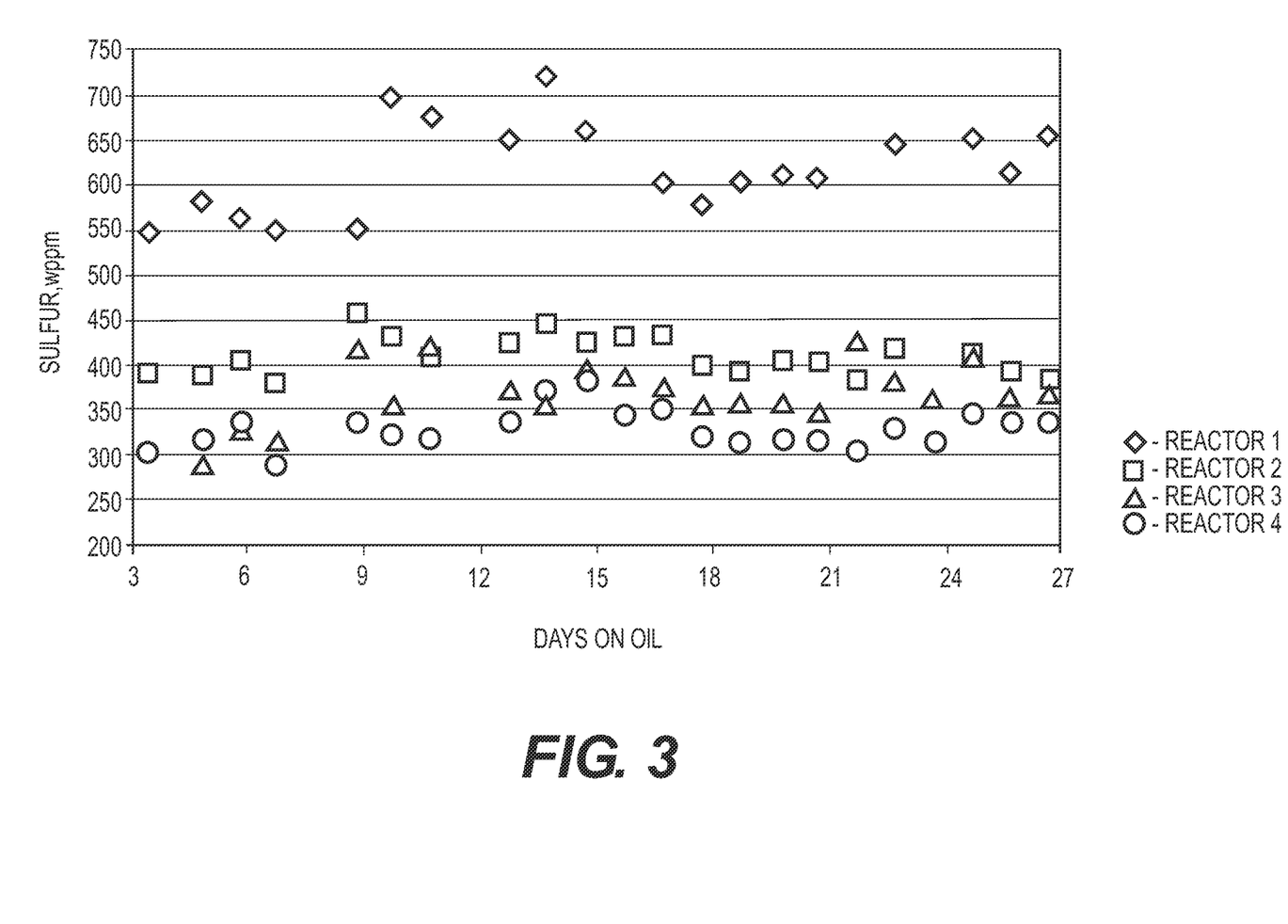
FIG. 3 shows sulfur removal using various catalyst systems.

In FIGS. 2 and 3, as described below, the diamond shapes correspond to Reactor 1, which included the gas phase sulfided conventional NiMo catalyst. The squares correspond to Reactor 2, with the liquid phase sulfided conventional NiMo catalyst. The triangles correspond to Reactor 3, which included about 25% of the bulk catalyst downstream of about 75% of the conventional NiMo catalyst. Finally, the circles correspond to Reactor 4, which included about 50% of the bulk catalyst downstream of about 50% of the conventional NiMo catalyst.

FIG. 2 shows the benefit of hydrotreating the feed using at least a portion of bulk metal catalyst. In FIG. 2, the run from Reactor 3 (triangles) using a ~25% loading of bulk metal catalyst shows an improvement in nitrogen removal from about 200 wppm to about 250 wppm, relative to the best performance using only conventional catalyst. The run from Reactor 4 (circles), using a ~50% loading of bulk metal catalyst, shows a further improvement from about 50 wppm to about 100 wppm for nitrogen removal, relative to the lower amount of bulk metal catalyst. The additional nitrogen removal from a relatively high nitrogen feed represents a significant improvement for several reasons. In addition to providing greater removal of contaminants under comparable conditions, the additional reduction of nitrogen during a reaction stage using a bulk metal catalyst can advantageously enhance the activity of later reaction stages, as the amount, and thus incremental activity suppression, of the nitrogen compounds can be accordingly reduced/avoided.

The use of the bulk metal catalyst can also provide at least comparable performance for sulfur removal. FIG. 3 shows the results for sulfur removal from each of the reactors. The data shows that the reactors including bulk metal catalyst showed at least similar sulfur removal and/or had a small improvement in sulfur removal capability, relative to the best results using only conventional catalyst. Thus, using a bulk metal catalyst can improve nitrogen removal for a relatively high nitrogen feed while providing at least comparable sulfur removal capabilities.

Additionally, the runs including the bulk metal catalyst also showed improvement in the amount of aromatic saturation. In a fluid catalytic cracking process, typically little or no aromatic saturation occurs. Thus, any additional aromatic removal and/or saturation that can be achieved prior to an FCC process can be particularly beneficial. A relatively high nitrogen feed can tend to accentuate this problem, as the relatively high amount of nitrogen can tend to suppress aromatic saturation activity. Table 1 below shows additional product details for the products from the four reactors. For each of the runs shown below, the total amount of aromatics in the feed was about 50 wt %.

TABLE 1

| Aromatics wt % | Conventional (gas sulfide) | Conventional (liq. sulfide) | 75% conv/ 25% bulk | 50% conv/ 50% bulk |
|---|---|---|---|---|
| Mono | 32.8 | 33.5 | 33.9 | 33.7 |
| Di | 4.1 | 3.9 | 3.5 | 3.6 |
| 3+ | 4.5 | 3.8 | 3.3 | 3.2 |
| Total | 41.4 | 41.1 | 40.7 | 40.5 |
| API gravity | 24.8 | 25.0 | 25.2 | 25.3 |

As shown in the Table above, the runs including the bulk metal catalyst showed reduced totals of aromatics overall, reduced amounts of multi-ring aromatics, and improved API values. Note that the conventional catalysts (in Reactors 1 and 2) resulted in saturation or other removal of about 10% of the total aromatics. Use of at least a portion of bulk catalyst (in Reactors 3 and 4) provided an additional improvement in aromatics removal from about 0.4 wt % to about 0.9 wt %, corresponding to about a 5-10% improvement in aromatic saturation or removal. Additionally, the products from Reactors 3 and 4 appear to have an improved distribution of types of aromatics, as the number of multi-ring aromatics is reduced in comparison to the runs using conventional NiMo hydrotreatment catalysts. Since a typical FCC process does not typically convert aromatics, the reduced aromatic compound product achieved using the bulk metal catalyst systems represents a higher value feed for use in an FCC process. It is noted that the boiling point distribution of the product feeds from each of Reactors 1-4 was approximately similar throughout the full boiling range.

Example 6

Bulk Vs. Supported Catalytic Hydrotreatment Processes

A mineral feedstock (e.g., a vacuum gasoil such as listed in Table 2 below) is contacted with a bulk NiMoW catalyst and a commercially available alumina-supported NiMo catalyst for about 77 days at a variety of process conditions, such that the bulk catalyst and the supported catalyst have a relative volumetric hydrodesulfurization activity of about 40% and about 50%, respectively, of that of the respective fresh catalysts of identical composition. About 20 wt % of a biocomponent feedstock (e.g., a soybean oil such as listed in Table 2 below) can be added to about 80 wt % of the VGO mineral feedstock to form a mixed feed, which can thereafter be contacted in a hydroprocessing reactor with a hydrogen treat gas in the presence of the supported and bulk catalysts at a temperature of about 680° F. (about 360° C.) and at a total reactor pressure of about 1280 psig (about 8.8 MPag). The treat gas (~100% hydrogen) was introduced at a rate of about 5900 scf/bbl (about 1000 $Nm^3/m^3$). The hydroprocessing reactor had an LHSV of about 1.1 $hr^{-1}$ for the bulk catalyst and about 0.8 $hr^{-1}$ for the supported catalyst. The hydroprocessing was done in parallel pilot units comprising a ~10 $cm^3$ hydroprocessing reactor loaded with an activated catalyst based on the commercially available alumina-supported NiMo catalyst, and a ~7 $cm^3$ hydroprocessing reactor loaded with an activated catalyst based on the bulk NiMoW catalyst.

Significant water, CO, and $CO_2$ were formed during the hydrotreatment reaction involving the mixed (oxygenated biocomponent-containing) feed, and, under circumstances where some naphtha is also made, such naphtha so formed can be isolated and sent to a mogas pool, if desired, or can be recycled to another refinery process. At least about 90% of the oxygen from the biocomponent portion of the mixed feed can be removed by this process.

TABLE 2

| Base Feed | Mineral feed | Biocomponent feed | Mixed feed |
|---|---|---|---|
| Soybean Oil Content | — | 100 wt % | 20 wt % |
| Vacuum Gasoil Content | 100 wt % | — | 80 wt % |
| API gravity | 28.4 | 21.7 | ~27.1 |
| Sulfur, wppm | 26,000 | <0.3 | ~20,800 |
| Nitrogen, wppm | 830 | 14 | ~670 |
| Bromine # | — | 62.6 | — |
| IBP, ° F. | 570 | | |
| T5, ° F. | 662 | | |
| T10, ° F. | 694 | | |
| T20, ° F. | 734 | | |
| T30, ° F. | 766 | | |
| T40, ° F. | 793 | | |
| T50, ° F. | 817 | | |
| T60, ° F. | 840 | | |
| T70, ° F. | 865 | | |
| T80, ° F. | 892 | | |
| T90, ° F. | 927 | | |
| T95, ° F. | 950 | | |
| T99.5, ° F. | 1004 | | |
| 1-Ring Aromatics | 14.0 wt % | | |
| 2-Ring Aromatics | 16 wt % | | |
| 3-Ring Aromatics | 20 wt % | | |
| Total Aromatics | 50 wt % | | |
| $H_2$ Content, mass % | 12.1 | | |

Each sample feedstock was run for about 2-3 days on oil, and the liquid product was sampled periodically (roughly daily). At the end of the period on oil for each of the feedstocks contacted with each of the catalysts, the gaseous products exhibited the properties in Table 3 below, which are described on a nitrogen-free, oxygen-free, and hydrogen sulfide-free basis. Further, at the end of the periods on oil, the product sulfur contents for the mineral only feed were about 1100 wppm for the supported catalyst and about 520 wppm for the bulk catalyst, and the product sulfur contents for the mixed feed were about 400 wppm for the supported catalyst and about 160 wppm for the bulk catalyst.

It is noteworthy that the relative volumetric hydrodesulfurization activity of the partially (~40%) spent bulk catalyst was roughly 1.8 to 2.1 times that of the partially (~50%) spent supported catalyst, which is roughly consistent with the relative volumetric hydrodesulfurization activity ratio of the fresh bulk catalyst to the fresh supported catalyst (which varied between about 1.6 and 2.5). As a result of this observation, the stability of the hydrodesulfurization activity of the bulk catalyst, relative to that of the supported catalyst, seems to be affected very little (if at all) by the presence of oxygenated compounds (such as CO and/or $CO_2$), which can tend to remove/displace sulfur activating compounds in many hydroprocessing catalysts, thus more quickly reducing activity and/or requiring more (and/or more frequent) addition (e.g., spiking) of activating sulfur compounds into the feed

TABLE 3

| | Supported NiMo | | Bulk NiMoW | |
|---|---|---|---|---|
| | Mineral feed | Mixed feed | Mineral feed | Mixed feed |
| Methane (wt %) | 0.35 | 2.16 | 0.37 | 1.19 |
| Ethane (wt %) | 0.40 | 0.54 | 0.37 | 0.45 |
| Propane (wt %) | 0.68 | 8.65 | 0.63 | 8.12 |
| Isobutane (wt %) | 0.11 | 0.13 | 0.10 | 0.13 |

TABLE 3-continued

|  | Supported NiMo | | Bulk NiMoW | |
| --- | --- | --- | --- | --- |
|  | Mineral feed | Mixed feed | Mineral feed | Mixed feed |
| n-butane (wt %) | 0.55 | 0.65 | 0.51 | 0.71 |
| Isopentane (wt %) | 0.20 | 0.19 | 0.19 | 0.20 |
| n-pentane (wt %) | 0.39 | 0.46 | 0.37 | 0.55 |
| C6+ (wt %) | 2.70 | 3.47 | 3.48 | 4.56 |
| Hydrogen (wt %) | 94.6 | 77.2 | 94.0 | 73.8 |
| Carbon Dioxide (wt %) | 0.0 | 3.16 | 0.0 | 4.50 |
| Carbon Monoxide (wt %) | 0.0 | 3.37 | 0.0 | 5.85 |

In Table 3, the relative increase in the CO and $CO_2$ contents of the gaseous products for the mixed feed of the bulk catalyst over the supported catalyst indicates that the former exhibits more oxygen heteroatom removal (deoxygenation) through decarbonylation and/or decarboxylation of the biocomponent portion of the feed, whereas the relative decrease in the methane content of the bulk catalyst over the supported catalyst indicates that the latter exhibits more methanation of the $CO/CO_2$ byproducts from the biocomponent portion of the feed, which methanation reaction increases hydrogen gas consumption over the corresponding decarbonylation and/or decarboxylation reaction(s), and which methanation reaction can cause and/or exacerbate temperature excursions that can detrimentally affect hydroprocessing units and/or catalytic activity/efficiency/effectiveness.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A method for effectively utilizing heteroatom removal capability of a bulk catalyst in removing heteroatoms from a hydrocarbon feedstock, the method comprising:

hydrotreating a first hydrocarbon feedstock by contacting the first feedstock with a bulk catalyst containing at least three of the following metals: cobalt, nickel, molybdenum, and tungsten, said bulk catalyst in its unused state having a relative volumetric catalytic activity for hydrodesulfurization and/or hydrodenitrogenation, with the contacting being done under conditions effective to at least partially hydrodesulfurize and/or hydrodenitrogenate the first feedstock, wherein the contacting continues until the bulk catalyst exhibits a relative volumetric hydrodesulfurization activity of not more than 60% of the relative volumetric hydrodesulfurization activity in its unused state;

isolating the hydrotreated first hydrocarbon feedstock;

hydrotreating a second hydrocarbon feedstock by contacting the second feedstock with the bulk catalyst whose relative volumetric hydrodesulfurization activity is not more than 60% of the relative volumetric hydrodesulfurization activity in its unused state, with the contacting being done under conditions effective to at least partially hydrodesulfurize and/or hydrodenitrogenate the second feedstock, as well as to hydrodeoxygenate the second feedstock; and isolating the hydrotreated second hydrocarbon feedstock, wherein:

the second hydrocarbon feedstock contains at least 10 wt % more biocomponent content than the first hydrocarbon feedstock;

the first hydrocarbon feedstock has a pre-treated sulfur content, the hydrotreated first hydrocarbon feedstock has a post-treated sulfur content, and the post-treated sulfur content is no more than 1.0% of the pre-treated sulfur content;

the second hydrocarbon feedstock has a pre-treated oxygen content and a pre-treated sulfur content, the hydrotreated second hydrocarbon feedstock has a post-treated oxygen content and a post-treated sulfur content, the pre-treated oxygen content is no more than 0.5% of the post-treated oxygen content, and the post-treated sulfur content is no more than 2.0% of the pre-treated sulfur content; and the isolated hydrotreated first hydrocarbon feedstock and the isolated hydrotreated second hydrocarbon feedstock are both combined with a fuel pool.

2. The method of claim 1, wherein the first hydrocarbon feedstock has a sulfur content of at least 500 wppm and is comprised of from 80 wt % to 100 wt % of a diesel boiling range mineral feedstock and from 0 wt % to 20 wt % of a diesel boiling range biocomponent feedstock; wherein the second hydrocarbon feedstock has a sulfur content of at least 500 wppm and an oxygen content of at least 1 wt % and is comprised of from 10 wt % to 80 wt % of a diesel boiling range mineral feedstock and from 20 wt % to 90 wt % of a diesel boiling range biocomponent feedstock; and wherein the contacting in the first hydrotreatment step continues until the bulk catalyst exhibits a relative volumetric hydrodesulfurization activity of not more than 50% of the relative volumetric hydrodesulfurization activity in its unused state.

\* \* \* \* \*